(12) United States Patent
Gorin et al.

(10) Patent No.: US 9,542,358 B1
(45) Date of Patent: Jan. 10, 2017

(54) OVERLAPPED FAST FOURIER TRANSFORM BASED MEASUREMENTS USING FLAT-IN-TIME WINDOWING

(71) Applicant: Keysight Technologies, Inc., Minneapolis, MN (US)

(72) Inventors: Joseph M. Gorin, Santa Rosa, CA (US); Michael E. Barnard, Windsor, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 425 days.

(21) Appl. No.: 13/968,675

(22) Filed: Aug. 16, 2013

(51) Int. Cl.
*G06F 17/14* (2006.01)

(52) U.S. Cl.
CPC ................................ *G06F 17/142* (2013.01)

(58) Field of Classification Search
None
See application file for complete search history.

(56) References Cited

U.S. PATENT DOCUMENTS

| 6,128,591 | A * | 10/2000 | Taori et al. | 704/214 |
| 2008/0052335 | A1 * | 2/2008 | Gee | 708/400 |
| 2009/0216530 | A1 * | 8/2009 | Fallat et al. | 704/233 |

* cited by examiner

*Primary Examiner* — Michael D Yaary

(57) ABSTRACT

An electromagnetic interference (EMI) signal is processed by digitizing the EMI signal, generating a plurality of overlapping time records from the digitized EMI signal, applying a window function to the plurality of overlapping time records to produce a plurality of modified time records, wherein the window function has a substantially flat top, and performing a fast Fourier transform (FFT) on each of the modified time records to produce a plurality of corresponding amplitude envelopes.

20 Claims, 11 Drawing Sheets

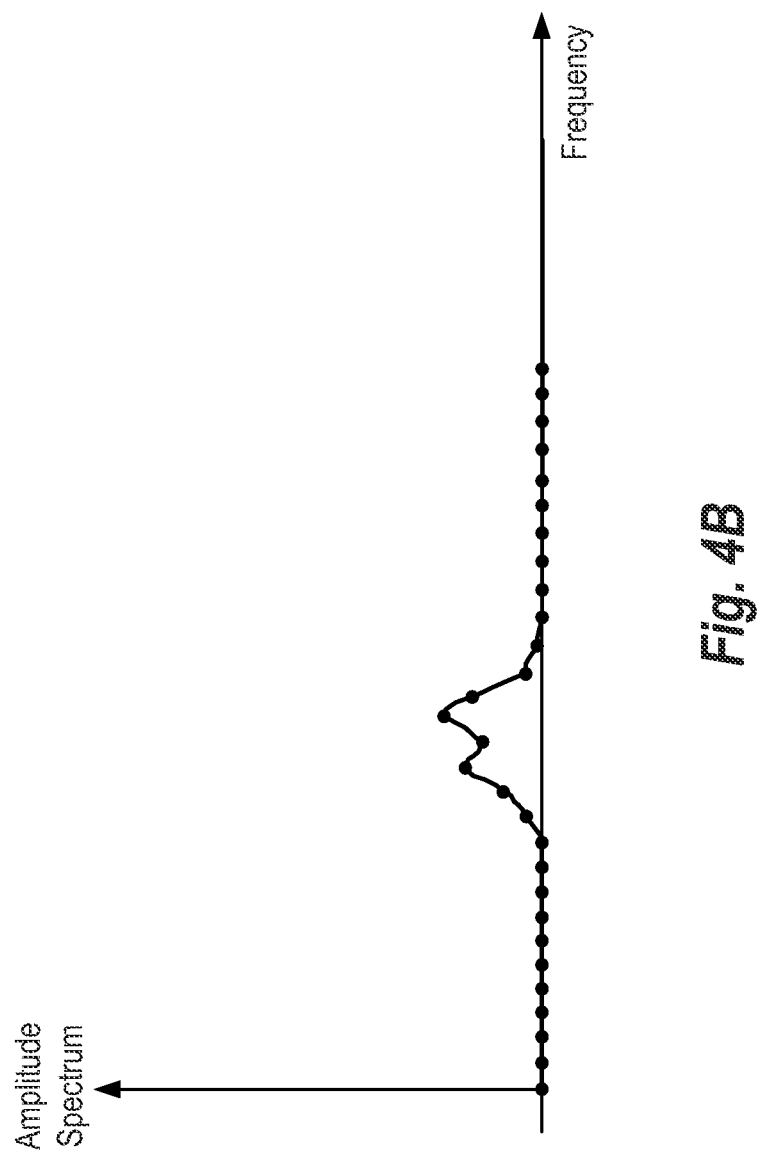

OVERLAPPED FAST FOURIER TRANSFORM BASED MEASUREMENTS USING FLAT-IN-TIME WINDOWING

BACKGROUND

Time-domain scan (TDS) is a method that performs "weighted" measurements across many frequencies during electromagnetic interference (EMI) emissions measurements. The weighted measurements are typically quasi-peak detector (QPD) measurements in which a measured signal level rises rapidly with a short rising time constant, but falls slowly with a longer decay time constant, thus emphasizing to a controlled degree a peak of the signal statistical distribution over its average value.

In a typical QPD measurement, the time constant for a signal to fall is around 0.5 s, and many time constants are required for the signal to settle. Consequently, it can take a long time to sweep through a frequency span. TDS, however, reduces this time burden by parallel processing. In particular, TDS uses fast Fourier transforms (FFTs) to generate an amplitude envelope at many frequencies from one time record. The amplitude envelope at each frequency is then assembled into a time waveform at each frequency which is then weighted with a weighting detector.

Conventional implementations of TDS suffer from various shortcomings that can limit the accuracy and/or cost of an EMI measurement system. For instance, in many conventional implementations of TDS, FFTs are performed with FFT windows that overlap by 90% or more in the time domain. This large overlap means that a relatively large number of FFTs must be performed, which in turn means that the measurement system must include more processing capability, e.g., extra hardware. On the other hand, smaller overlap tends to produce so-called time scalloping errors, which correspond to undesired variation in a computed spectrum with a time relationship between the FFT starting times and the signal event.

SUMMARY

In a representative embodiment, a method of processing an EMI signal comprises digitizing the EMI signal, generating a plurality of overlapping time records from the digitized EMI signal, applying a window function to the plurality of overlapping time records to produce a plurality of modified time records, wherein the window function has a substantially flat top, and performing an FFT on each of the modified time records to produce a plurality of corresponding amplitude envelopes.

In some related embodiments, the method further comprises combining the plurality of corresponding amplitude envelopes with weighting to produce an amplitude spectrum of the EMI signal. The combining may comprise, for instance, processing the amplitude envelopes with a QPD or root mean square (RMS) average detector. The overlapping time records may have an overlap of, e.g., less than 60% of the range of each time record.

In some related embodiments, the substantially flat top encompasses at least one sixteenth of a range of each of the time records. Alternatively, it may encompass, for instance, at least one half of a range of each of the time records, or it may extend across a range of 6.25 to 75 percent of each of the time records. The window function may correspond to, for instance, a Tukey window or a uniform window, and it may have a second derivative equal to zero at its center and/or be substantially symmetric about its center.

In another representative embodiment, a system configured to process an EMI signal comprises an analog to digital converter (ADC) configured to digitize the EMI signal, and a digital signal processing (DSP) component configured to generate a plurality of overlapping time records from the digitized EMI signal, apply a window function to the plurality of overlapping time records to produce a plurality of modified time records, wherein the window function has a substantially flat top, and perform an FFT on each of the modified time records to produce a plurality of corresponding amplitude envelopes. The DSP component may comprise, for instance, a field programmable gate array (FPGA), or software executed by a processor.

In some related embodiments, the DSP component is further configured to combine the plurality of corresponding amplitude envelopes with weighting to produce an amplitude spectrum of the EMI signal. In some related embodiments, the substantially flat top encompasses at least one sixteenth of a range of each of the time records. The window function may correspond to, for example, a Tukey window or a uniform window. The substantially flat top may extend across a range of, e.g., 6.25 to 75 percent of each of the time records. The overlapping time records may have an overlap of less than, e.g., 60% of the range of each time record.

BRIEF DESCRIPTION OF THE DRAWINGS

The described embodiments are best understood from the following detailed description when read with the accompanying drawing figures. Wherever applicable and practical, like reference numerals refer to like elements.

FIG. 4B is a graph illustrating the amplitude spectrum of FIG. 4A after weighted detection.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings. As used in the specification and appended claims, the terms 'a', 'an' and 'the' include both singular and plural referents, unless the context clearly dictates otherwise. Thus, for example, 'a device' includes one device and plural devices. As used in the specification and appended claims, and in addition to their ordinary meanings, the terms 'substantial' or 'substantially' mean to within acceptable limits or degree. As used in the specification and the appended claims and in addition to its ordinary meaning, the term 'approximately' means to within an acceptable limit or amount to one having ordinary skill in the art. For example, 'approximately the same' means that one of ordinary skill in the art would consider the items being compared to be the same.

The described embodiments relate generally to techniques for performing EMI measurements. For example, certain embodiments relate to systems and methods for characterizing the amplitude spectra of radiated or conducted EMI in electronic component testing. In certain embodiments, EMI measurements are conducted by performing FFTs on multiple overlapping time records that have been multiplied by a window function to address spectral leakage. The window function has a substantially flat top, which allows the time records to have less overlap and/or less time scalloping errors compared to conventional approaches.

Figure 1:
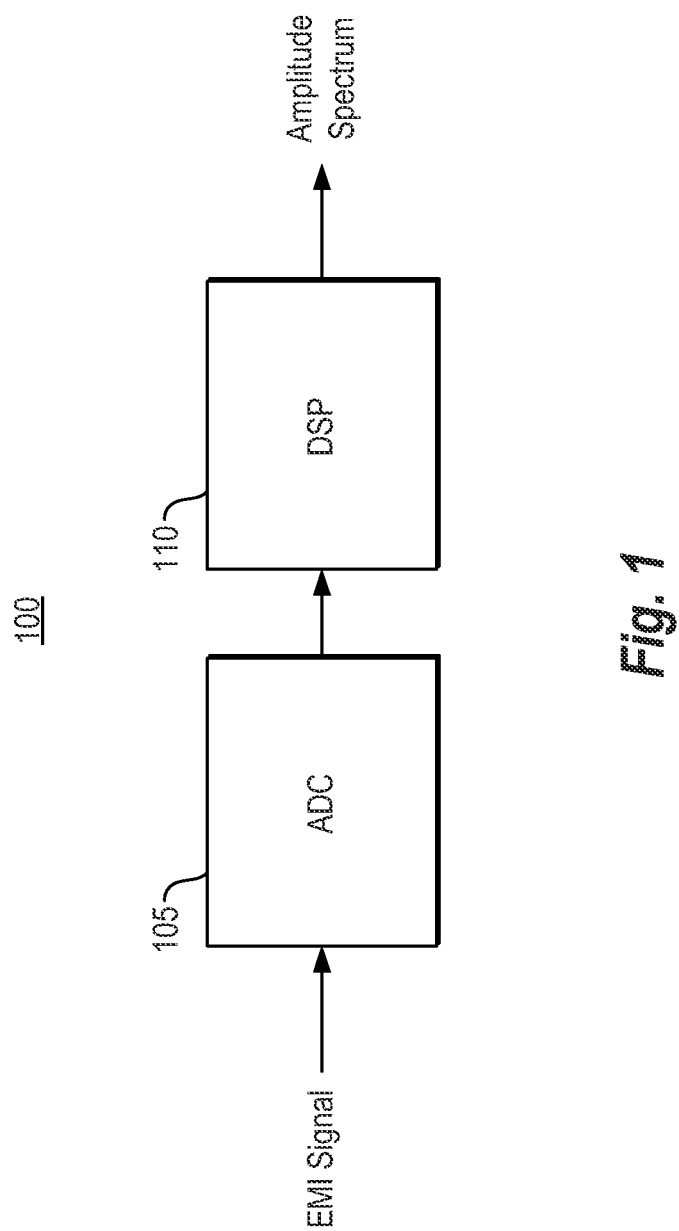
FIG. 1 is a block diagram illustrating an EMI measurement system, according to a representative embodiment.

FIG. 1 is a block diagram illustrating a EMI measurement system 100, according to a representative embodiment. EMI measurement system 100 performs time-domain EMI measurements.

Referring to FIG. 1, EMI measurement system 100 comprises an ADC 105 and a DSP component 110. The system receives an EMI signal and processes the received signal to produce an amplitude spectrum. The received EMI signal may be, e.g., radiated EMI received through an antenna, or conducted EMI received through a line impedance stabilization network (LISN). The system may be used, for instance, to perform EMI measurements on a device under test (DUT) within an anechoic chamber. The EMI signal may take any form, although certain forms of EMI are relatively difficult to detect and require sophisticated processing for proper characterization. For instance, EMI signals in the form of transient pulses of low repetition rate may be missed or mischaracterized by conventional EMI measurement systems.

During typical operation of EMI measurement system 100, ADC 105 receives the EMI signal and converts it into a digitized EMI signal. DSP component 110 receives the digitized EMI signal from ADC 105 and performs Fourier analysis on the received signal to produce an amplitude spectrum of the EMI signal. The Fourier analysis typically comprises performing FFTs on different overlapping segments of the digitized EMI signal, referred to as overlapping time records. These FFTs are generally performed in parallel to increase the speed at which the amplitude spectrum is generated. In addition, a window function is applied to each of the time records prior to performance of the FFTs in order to limit spectral leakage, as will be apparent from the description that follows.

Figure 2:
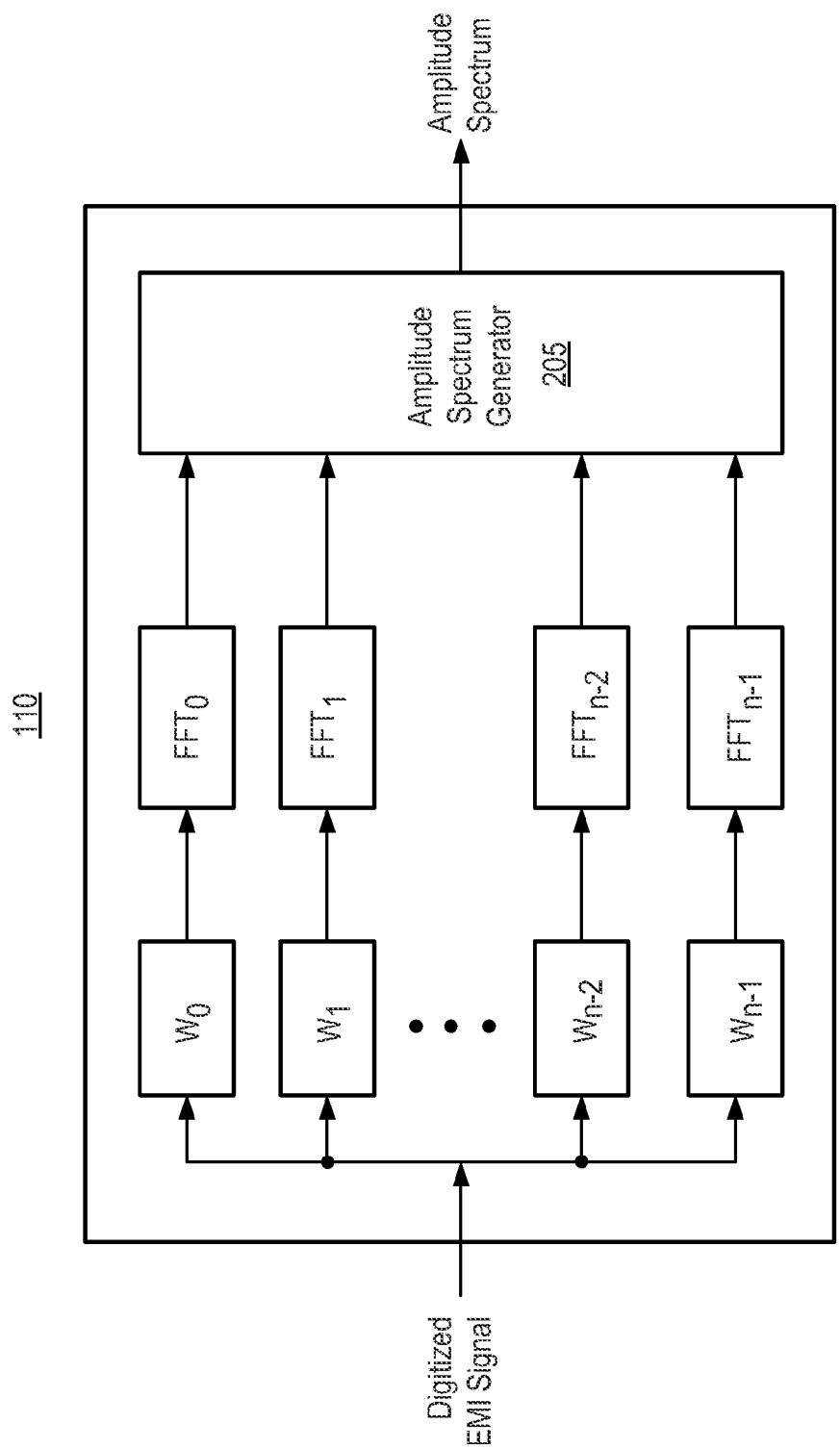
FIG. 2 is a block diagram illustrating a DSP component in the EMI measurement system of FIG. 1, according to a representative embodiment.

FIG. 2 is a block diagram illustrating an example of DSP component 110 in EMI measurement system 100 of FIG. 1, according to a representative embodiment. In various alternative embodiments, some or all of the functions of DSP component 110 can be implemented in hardware and/or software. For instance, in some embodiments, DSP component 110 comprises an FPGA configured to perform windowing and FFTs.

Referring to FIG. 2, DSP component 110 comprises a plurality of windowing units $w_0$ through $w_{n-1}$, a plurality of FFT units $FFT_0$ through $FFT_{n-1}$, and an amplitude spectrum generator 205. As illustrated by FIG. 2, these components operate to convert the digitized EMI signal into an amplitude spectrum.

Windowing units $w_0$ through $w_{n-1}$ and FFT units $FFT_0$ through $FFT_{n-1}$ perform parallel operations on a plurality of overlapping time records of the digital EMI signal. Each of the time records comprises a segment of the digital EMI signal, i.e., a sequence of samples covering a discrete time range. Typically, each time record comprises the same number of samples and has a predetermined overlap with neighboring time records. The overlap can be defined as a percentage of the total span or range of each time record. For instance, it may be 50 to 93.75% (½ to 1 1/16) of the range of each time record, although it is not limited to this range.

Figure 6A:
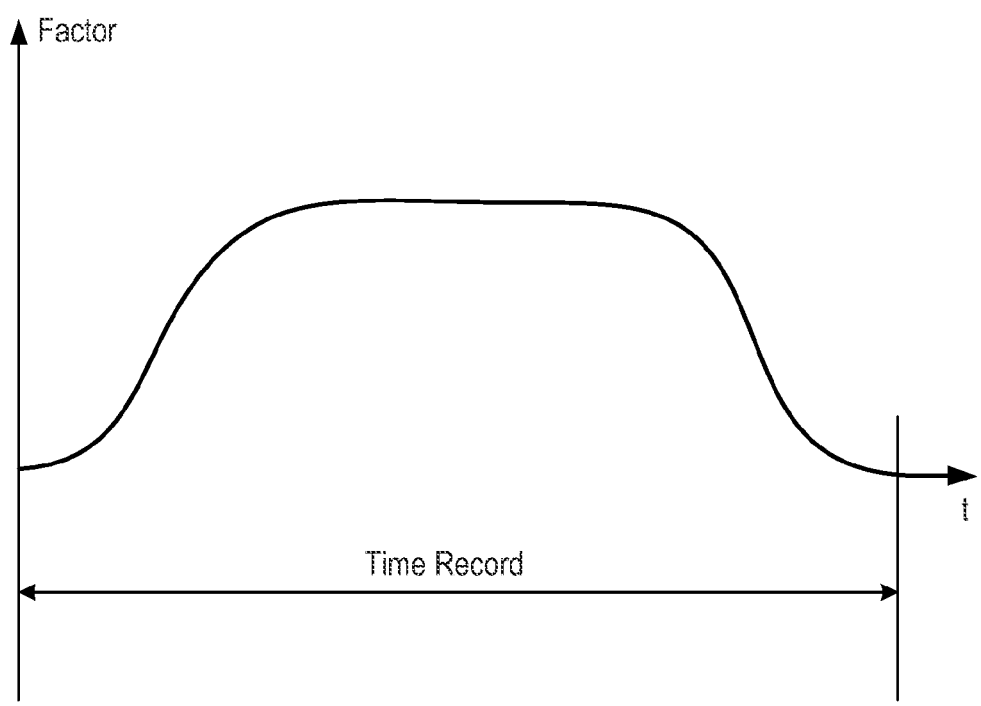
FIG. 6A is a graph illustrating an example of a window function to be applied to a time record, according to a representative embodiment.

Each of windowing units $w_0$ through $w_{n-1}$ applies a window function to the corresponding time record to produce a modified time record. The window function in this example is a time-domain multiplication factor that has a flat top at its center and then tapers to zero at its edges. Accordingly, application of the window function to the time record modifies the time record such that it tapers to zero at its edges. As will be explained in further detail below, the tapering of the time record to zero at its edges prevents spectral leakage from being introduced into a corresponding amplitude envelope produced by an FFT of the modified time record. An example of the window function is illustrated in FIG. 6A, and various other window functions are described in relation to FIG. 6A.

FFT units $FFT_0$ through $FFT_{n-1}$ each perform an FFT on a corresponding modified time record, and each FFT produces an amplitude envelope in the frequency domain. Because each of the modified time records corresponds to a different time slice of the EMI signal, the amplitude envelopes produced by the parallel FFTs can be assembled into an array of waveforms (voltage envelopes versus time) at each of the frequency points (bins) of the FFT. Each waveform of that array of waveforms can be processed by a weighted detector, such as the QPD or an RMS average detector, to give a single point result for each FFT bin frequency. The ensemble of these single-point results at each frequency gives the weighted-detector spectrum measurement desired. The weighted-detector spectrum is created by amplitude spectrum generator 205.

Various operating principles of EMI measurement system 100 will be described below with reference to specific signals and window functions illustrated in FIG. 3 through 7. These specific examples are presented as teaching examples, and variations of these examples will be apparent to those skilled in the art.

Figure 3:
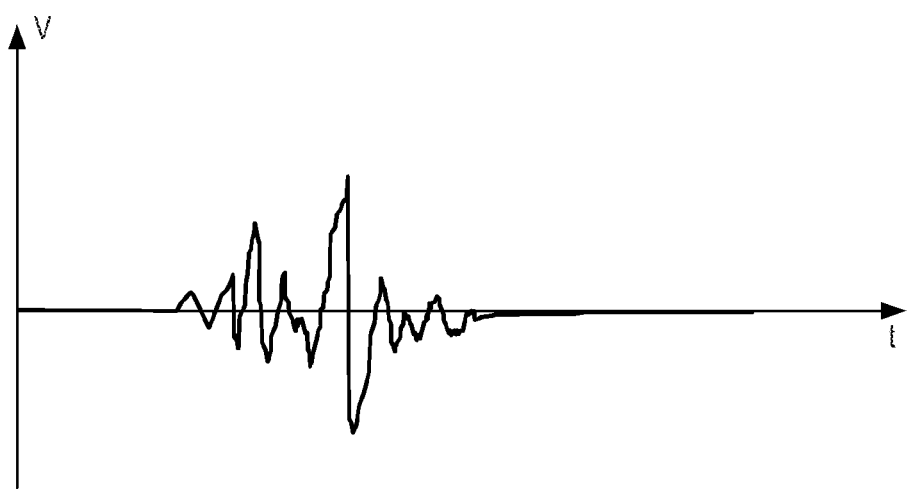
FIG. 3 is a graph illustrating an example of an EMI signal to be processed by the EMI measurement system of FIG. 1.

FIG. 3 is a graph illustrating an example of an EMI signal to be processed by EMI measurement system 100 of FIG. 1. The illustrated EMI signal is a resonant pulse, which may be a signal of interest for some types of EMI measurement. As illustrated by FIG. 3, the resonant pulse has a voltage of zero most of the time, and it oscillates above and below zero for a short duration.

Figure 4A:
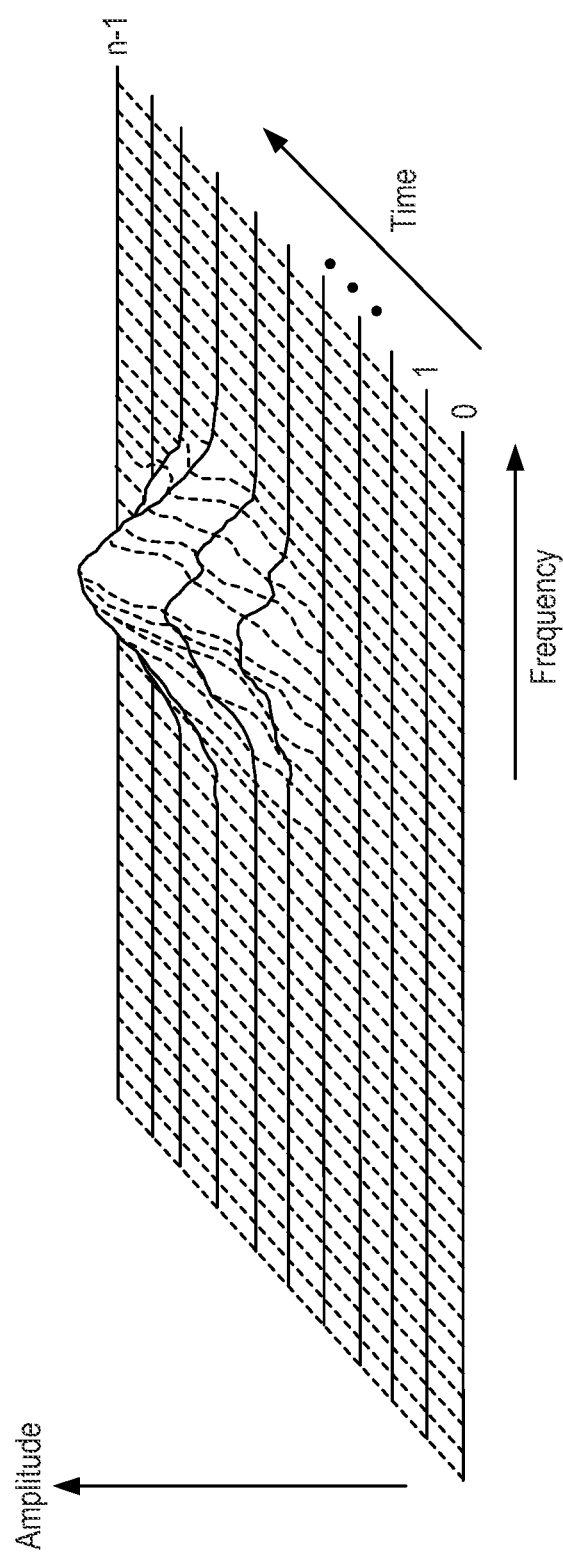
FIG. 4A is a graph illustrating an example amplitude spectrum of the EMI signal shown in FIG. 3.
Figure 4C:
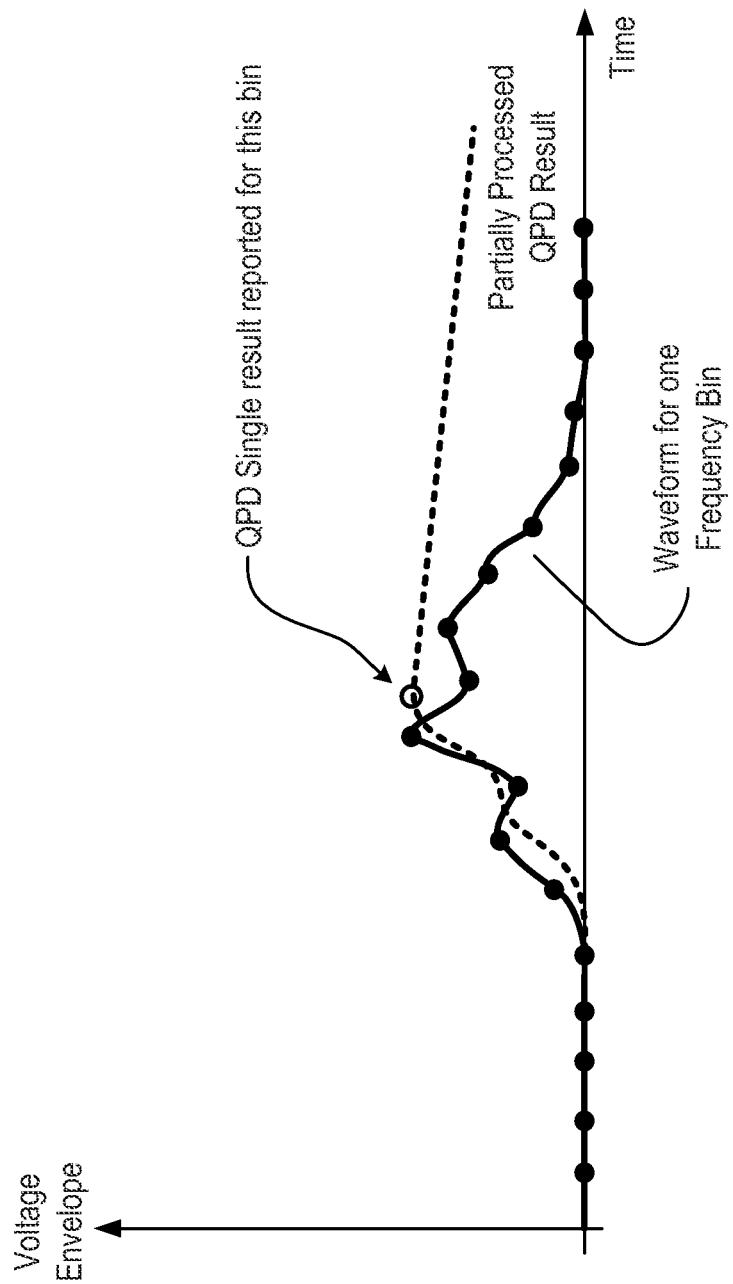
FIG. 4C is a graph illustrating a voltage envelope at a single frequency bin in the amplitude spectrum of FIG. 4A.

FIG. 4A is a graph illustrating an example amplitude spectrum of the EMI signal shown in FIG. 3, FIG. 4B is a graph illustrating the amplitude spectrum after weighted detection, and FIG. 4C is a graph illustrating a voltage envelope at a single frequency bin in the amplitude spectrum of FIG. 4A. The amplitude spectrum of FIG. 4A can be generated by a combination of windowing and FFTs, as described above in relation to FIGS. 1 and 2. The amplitude spectrum of FIG. 4B can be generated by amplitude spectrum generator 205 as described above in relation to FIG. 2.

Referring to FIG. 4A, for each of "n" time points 0 through n−1, a different time record of the EMI signal is processed by EMI measurement system 100 to produce a corresponding amplitude envelope. These different amplitude envelopes are shown as solid lines in FIG. 4A. Their variation across time is shown by dotted lines in FIG. 4A.

As illustrated by the waveform in FIG. 4A, the amplitude envelope of the EMI signal changes according to the time period over which it is estimated. Accordingly, generation of the amplitude spectrum allows analysis of the evolution of the amplitude envelope at each bin frequency of the FFTs.

Referring to FIG. 4B, the waveforms for each of the "n" times in FIG. 4A are processed with a weighted detector to create a single point for each bin frequency. In other words, the curves in the three-dimensional graph of FIG. 4A are combined in weighted fashion along the time axis to produce the two-dimensional graph of FIG. 4B. An example of this combination at a single frequency bin is illustrated in FIG. 4C. As illustrated in FIG. 4C, a QPD measurement combines data along the time axis. For each frequency, it reports a single point to be included in the waveform of FIG. 4B.

Figure 5A:
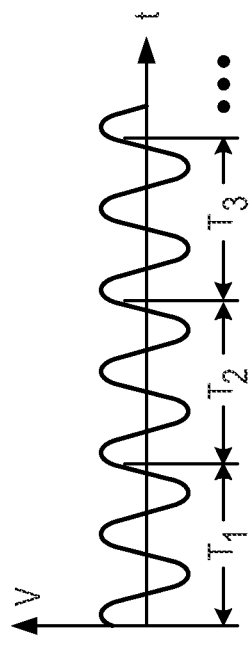
FIG. 5A is a graph illustrating a repeating time record comprising a signal whose period corresponds to the length of the time record.
Figure 5A:
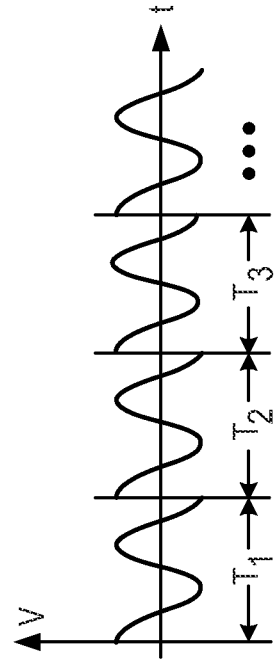
Figure 5A:
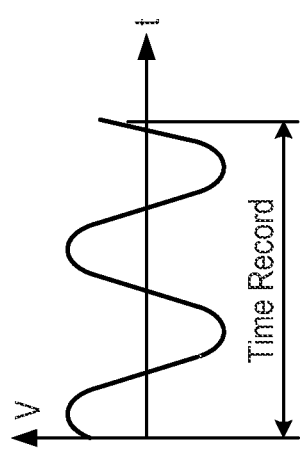
Figure 5B:
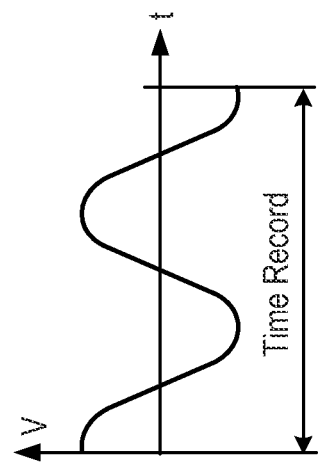
FIG. 5B is a graph illustrating a repeating time record comprising a signal whose period does not correspond to the length of the time record.

FIGS. 5A and 5B illustrate a potential source of distortion in the amplitude spectrum generated by EMI measurement system 100. In particular, they illustrate how distortion may be introduced by spectral leakage according to the period of a signal in each time record.

FIG. 5A is a graph illustrating a repeating time record comprising a signal whose period corresponds to the length of the time record. In general, an FFT treats a time record as though it repeats indefinitely, so the repeating time record in FIG. 5A corresponds to a continuous signal. Accordingly, where an FFT is performed on the signal illustrated in FIG. 5A, the power in the amplitude envelope will be at the frequency of the signal contained in the time record.

FIG. 5B is a graph illustrating a repeating time record comprising a signal whose period does not correspond to the length of the time record. Because the signal's period does not correspond to the length of the time record, the repeating time record contains discontinuities. Accordingly, where an FFT is performed on the signal illustrated in FIG. 5B, some of the power in the amplitude envelope will be spread across a broad range of frequencies due to the discontinuities. This spreading of power due to discontinuities is referred to as spectral leakage, and it is generally considered to be an undesirable form of distortion in the amplitude spectrum.

A common approach to reducing spectral leakage is the use of smooth time windowing, which involves multiplying the time record by a window function in the time domain to remove discontinuities. Typically, the window function exhibits a maximum value at the center of the window and goes smoothly down to zero at the boundaries of the window. When multiplied by such a window function, the signal in the modified time record will be zero at both of its boundaries, so the repeating time record will not contain discontinuities.

The most common form of window function is similar to a Gaussian curve, which is attractive because it has friendly mathematical properties, and because it avoids sidelobes in the amplitude spectrum. Nevertheless, a Gaussian window function also has certain drawbacks that can limit the performance of an EMI measurement system. For example, because the Gaussian curve has a maximum value at the center of the window, it will tend to attenuate signals that are off center with respect to the time record. This can be especially problematic, for instance, where an EMI signal is a short pulse located at a peripheral portion of the time record. Under those circumstances, the amplitude spectrum may seriously misrepresent the nature of the EMI signal. One way to overcome this potential misrepresentation is to use a relatively high amount of overlap between adjacent overlapping time records so that at least one time record includes the short pulse near its center. The problem with high overlap, however, is that it requires a relatively large number of windowing units and FFT units to perform all of the required operations in parallel, which tends to increase the cost and complexity of the EMI measurement system. These and other shortcomings can be addressed, however, by using an alternative window function such as that illustrated in FIG. 6A.

Figure 6B:
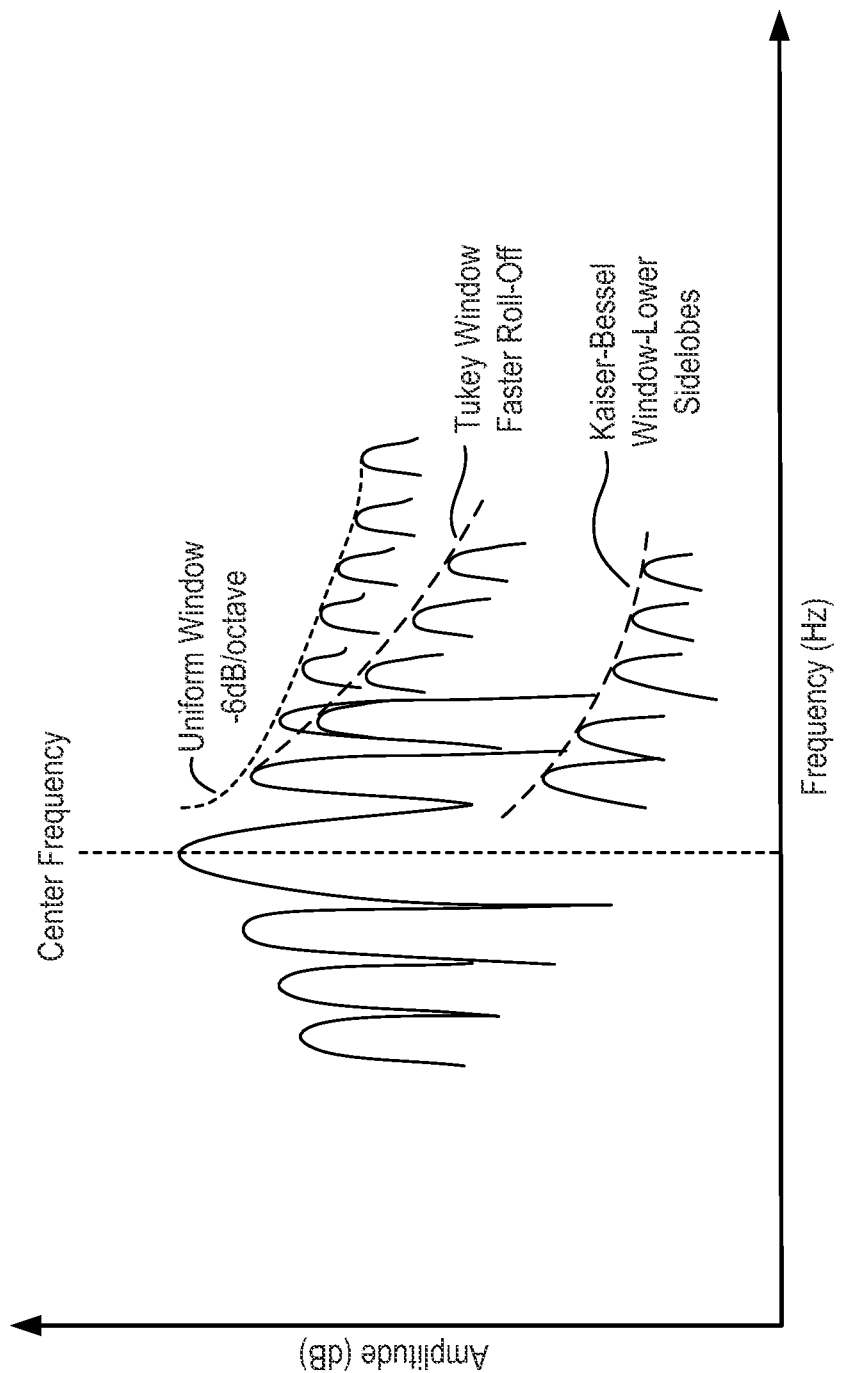
FIG. 6B is a graph illustrating a comparison between FFTs of various alternative window functions.

FIG. 6A is a graph illustrating an example of a window function to be applied to a time record, according to a representative embodiment, and FIG. 6B is a graph illustrating a comparison between FFTs of various alternative window functions.

Referring to FIG. 6A, the illustrated window function has a substantially flat top that extends over a substantial portion of the time record. In the illustrated example, the flat top encompasses about one half of the range of the time record, although the amount may be varied according to design considerations, such as the amount of desired overlap between adjacent time records and the tolerance for sidelobes in the FFT results, for example.

In general, there is a tradeoff between the width of the flat region and the magnitude and degree of dropoff away from the carrier of sidelobes in the resulting amplitude spectrum. Accordingly, the window function can be designed and/or adjusted in consideration of these tradeoffs. For instance, referring to FIG. 6B, a uniform window has relatively large sidelobes compared to a Tukey window and a Kaiser-Bessel window, and the Tukey window has relatively large sidelobes compared to the Kaiser-Bessel window. On the other hand, the uniform window has a larger flat region than the Tukey window and the Kaiser-Bessel window, and the Tukey window has a larger flat region than the Kaiser-Bessel window.

The sidelobes of the uniform window are too large for most applications, including EMI measurements, because their amplitude is high (e.g., −13 dB for that closest to the center frequency FIG. 6B) and because they fall off very gradually. The sidelobes of the Kaiser-Bessel window, which is an attractive window for spectrum analysis, are relatively low (e.g., −110 dB for that closest to the center frequency in FIG. 6B). This is significantly better than necessary for most EMI measurements. The sidelobes of the Tukey window are about as high as the uniform window, but the sidelobes drop off fast enough to allow EMI measurements with minimal masking of unknown emissions-to-bemeasured by those occasional known emissions, such as a radio station near an open EMI test site The window function of FIG. 6A is derived from the Tukey window but is adjusted according to the above-indicated tradeoffs. Alternatively, an actual Tukey window, or other Tukey-like windows could be used. The Tukey window comprises a "raised cosine" of a width determined by a parameter "alpha" to transition from a factor of zero at the beginning to unity at the end of the taper, then has a unity value to the middle of the time record. The second half of the window function is mirror-symmetric around the first, although the window function is not required to be symmetric. Still other "Tukey-like" windows may be defined that have different relationships of sidelobe levels and sidelobe slopes achieved by adjusting the shape of the taper region. An extreme variation of the illustrated window function would be a so-called uniform window or rectangular window in which the flat region extends all the way across the time record.

Figure 7A:
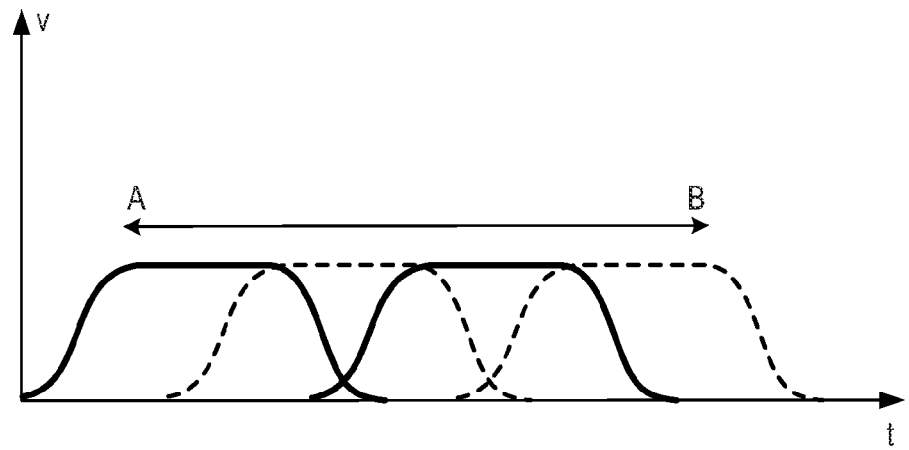
FIG. 7A is a graph illustrating an example of multiple overlapping window functions to be applied to multiple overlapping time records, according to a representative embodiment.

FIG. 7A is a graph illustrating an example of multiple overlapping window functions to be applied to multiple overlapping time records, according to a representative embodiment.

Referring to FIG. 7A, multiple instances of the window function shown in FIG. 6A are applied to a plurality of overlapping time records. For simplicity, FIG. 7A does not show any EMI signals within the time records, although their presence is assumed. As explained in relation to FIG. 2, an FFT is performed with respect to each time record after it has been multiplied by the corresponding window function.

Figure 7B:
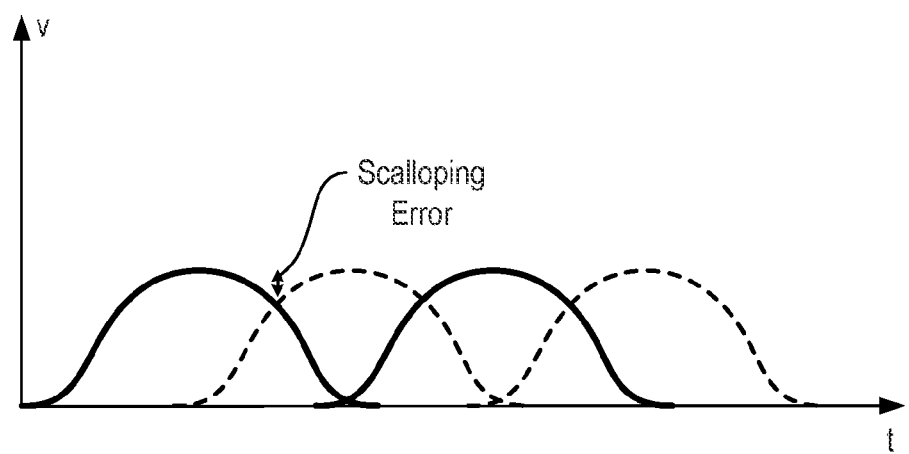
FIG. 7B is a graph illustrating an example of multiple overlapping window functions with a time scalloping error, according to a representative embodiment.

With the overlap illustrated in FIG. 7A, the maximum multiplication factor applied between points A and B along the time continuum is substantially the same. In other words, the overlapping window functions form a flat region between points A and B. In contrast, as illustrated in FIG. 7B, with the same overlap and a more curved window function, the maximum multiplication factor is lower at certain points, which can result in time-dependence of the EMI measurement, referred to as a time scalloping error. With a Gaussian window function, significant time scalloping error may occur even if adjacent time records are overlapped by more than ⅔. However, as illustrated in FIG. 7A, less overlap is required when the window function is substantially flat over a significant portion of the time record.

As indicated above, a reduction in the overlap of adjacent time records tends to reduce the amount of processing (e.g., hardware and/or software) required to compute FFTs across a predetermined time range of the EMI signal. In other words, greater overlap means that more FFTs must be computed across the same time range of the EMI signal, so reducing overlap can reduce required computational burden and processing components of EMI measurements.

Figure 8:
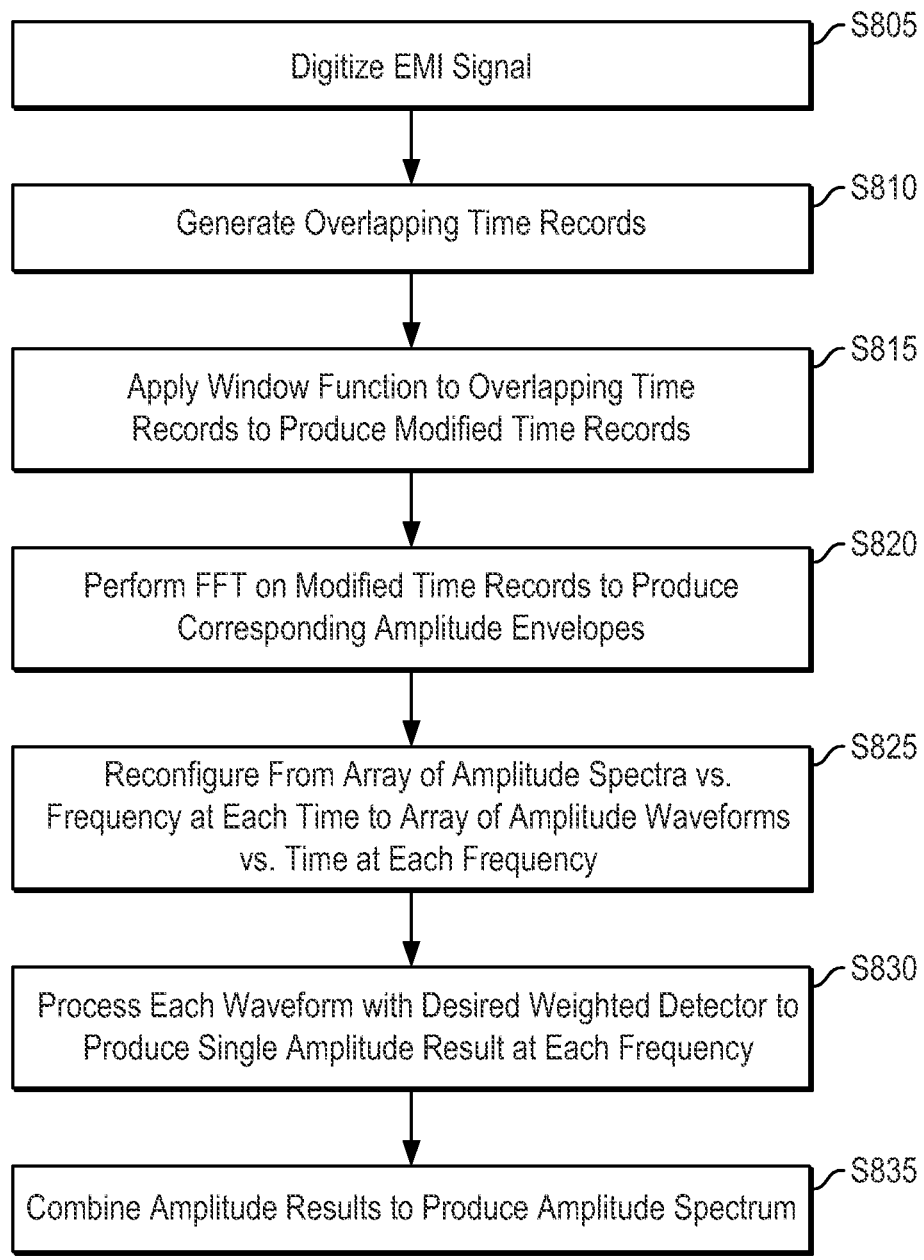
FIG. 8 is a flowchart illustrating a method of processing an EMI signal, according to a representative embodiment.

FIG. 8 is a flowchart illustrating a method of processing an EMI signal, according to a representative embodiment. This method could be performed by an EMI measurement system such as that illustrated in FIG. 1, although it is not restricted to this or any other system implementation.

Referring to FIG. 8, the method begins by digitizing an EMI signal (S805). This is typically performed by a high frequency ADC. The method continues by generating a plurality of overlapping time records from the digitized EMI signal (S810). The generation of time records may be accomplished, for instance, by controlling data buffers to store the overlapping time records or by controlling windowing units to access certain portions of the digitized EMI signal as stored in a buffer. The method further comprises applying a window function to the plurality of overlapping time records to produce a plurality of modified time records, wherein the window function has a substantially flat top (S815). The window function could be, for instance, a curve such as that illustrated in FIG. 6A.

The substantially flat top may vary in its extent. For instance, in some embodiments, the substantially flat top encompasses at least one fourth or one half of a range of each of the time records. The substantially flat top may also be defined as extending across a range of each of the time records, e.g., ten to fifty percent of the range. In some embodiments, the window function corresponds to a Tukey window or a uniform window. One way of characterizing a window function having a substantially flat top is that it may have a second derivative equal to zero at its center. In contrast, a window function such as a Gaussian window does not have a second derivative equal to zero at its center. Moreover, although the window function is generally substantially symmetric about its center, it may be non-symmetrical in certain embodiments.

As indicated above, the use of a window function with a substantially flat top may allow the overlapping time records to have a relatively small overlap. For example, in some embodiments they may overlap by less than 60% of the range of each time record.

The method further comprises performing an FFT on each of the modified time records to produce a plurality of corresponding amplitude envelopes (S820). These FFTs can be performed, for instance, by a plurality of FFT units arranged in parallel as illustrated in FIG. 2. The results of this array of spectra for n−1 times can be reconfigured as an array of waveforms at each separate bin of the FFT frequencies (S825). Each of these waveforms is processed with a weighted detector (S830) to create a single point for each bin frequency. Finally, the method comprises combining the plurality of corresponding bin results to produce an amplitude spectrum of the EMI signal (S835).

As indicated by the foregoing, the use of a window function with a substantially flat top may allow an EMI measurement system to be implemented with relatively less overlap between adjacent time records, which can reduce the computational burden of the system. The use of such a window function can also reduce time scalloping errors, which can improve accuracy of EMI measurements. In general, the use of a window function with a flat top may increase the prevalence of sidelobes in the determined amplitude spectrum of an EMI signal. However, the presence of those sidelobes may be permissible in certain types of EMI measurements, and may be justified by countervailing benefits of the window function, as will be appreciated by those skilled in the art.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:
1. A method of processing an electromagnetic interference (EMI) signal, comprising:
digitizing the EMI signal;
generating a plurality of overlapping time records from the digitized EMI signal;

applying a window function to the plurality of overlapping time records to produce a plurality of modified time records, wherein the window function has a substantially flat top; and performing a fast Fourier transform (FFT) on each of the modified time records to produce a plurality of corresponding amplitude envelopes.

2. The method of claim 1, further comprising combining the plurality of corresponding amplitude envelopes with weighting to produce an amplitude spectrum of the EMI signal.

3. The method of claim 2, wherein the combining the plurality of corresponding amplitude envelopes with weighting comprises processing the amplitude envelopes with a quasi-peak detector (QPD) or root mean square (RMS) average detector.

4. The method of claim 1, wherein the substantially flat top encompasses at least one sixteenth of a range of each of the time records.

5. The method of claim 1, wherein the substantially flat top encompasses at least one half of a range of each of the time records.

6. The method of claim 1, wherein the window function corresponds to a Tukey window.

7. The method of claim 1, wherein the window function corresponds to a uniform window.

8. The method of claim 1, wherein the substantially flat top extends across a range of 6.25 to 75 percent of each of the time records.

9. The method of claim 1, wherein the window function has a second derivative equal to zero at its center.

10. The method of claim 1 wherein the window function is substantially symmetric about its center.

11. The method of claim 1, wherein the overlapping time records have an overlap of less than 60% of the range of each time record.

12. A system configured to process an electromagnetic interference (EMI) signal, comprising:
   an analog to digital converter (ADC) configured to digitize the EMI signal; and
   a digital signal processing (DSP) component configured to generate a plurality of overlapping time records from the digitized EMI signal, apply a window function to the plurality of overlapping time records to produce a plurality of modified time records, wherein the window function has a substantially flat top, and perform a fast Fourier transform (FFT) on each of the modified time records to produce a plurality of corresponding amplitude envelopes.

13. The system of claim 12, wherein the DSP component comprises a field programmable gate array (FPGA).

14. The system of claim 12, wherein the DSP component comprises software executed by a processor.

15. The system of claim 12, wherein the DSP component is further configured to combine the plurality of corresponding amplitude envelopes with weighting to produce an amplitude spectrum of the EMI signal.

16. The system of claim 1, wherein the substantially flat top encompasses at least one sixteenth of a range of each of the time records.

17. The system of claim 12, wherein the window function corresponds to a Tukey window.

18. The system of claim 12, wherein the window function corresponds to a uniform window.

19. The system of claim 12, wherein the substantially flat top extends across a range of 6.25 to 75 percent of each of the time records.

20. The system of claim 12, wherein the overlapping time records have an overlap of less than 60% of the range of each time record.

* * * * *